July 20, 1954   J. A. LOVE   2,683,960
LIFT TYPE DISK HARROW

Filed June 21, 1948   2 Sheets-Sheet 1

INVENTOR
JABEZ A. LOVE.
BY
Oltsch & Knoblock
ATTORNEYS

July 20, 1954  J. A. LOVE  2,683,960
LIFT TYPE DISK HARROW
Filed June 21, 1948  2 Sheets-Sheet 2

INVENTOR
JABEZ A. LOVE.
BY
Oltsch & Knoblock
ATTORNEYS

Patented July 20, 1954

2,683,960

UNITED STATES PATENT OFFICE 2,683,960

LIFT TYPE DISK HARROW

Jabez A. Love, Eau Claire, Mich.

Application June 21, 1948, Serial No. 34,302

7 Claims. (Cl. 55—83)

This invention relates to improvements in lift type disk harrows, and more particularly to a harrow adapted to be connected to a tractor by a hitch having three connection points spaced vertically and laterally relative to each other.

The primary object of this invention is to provide a novel, simple, low cost harrow of light weight.

A further object is to provide a device of this character having a rigid frame to which disk gangs may be connected rigidly in selected adjustment.

A further object is to provide a disk harrow of this character adapted for attachment to a tractor-carried implement hitch having three hitch arms spaced laterally and vertically, which implement is characterized by a rigid frame and rigid disk gangs fixedly connected thereto, said implement carrying connecting means adapted to be pivotally connected to one of said hitch arms, which is characterized by a limited movement relative to the hitch and to the harrow to accommodate change in the working position of the harrow to conform to ground contour, with said shaft movement limited when the hitch is actuated in elevating direction to accommodate bodily lifting of the entire implement above the ground.

Other objects will be apparent from the following specification.

Figure 1:
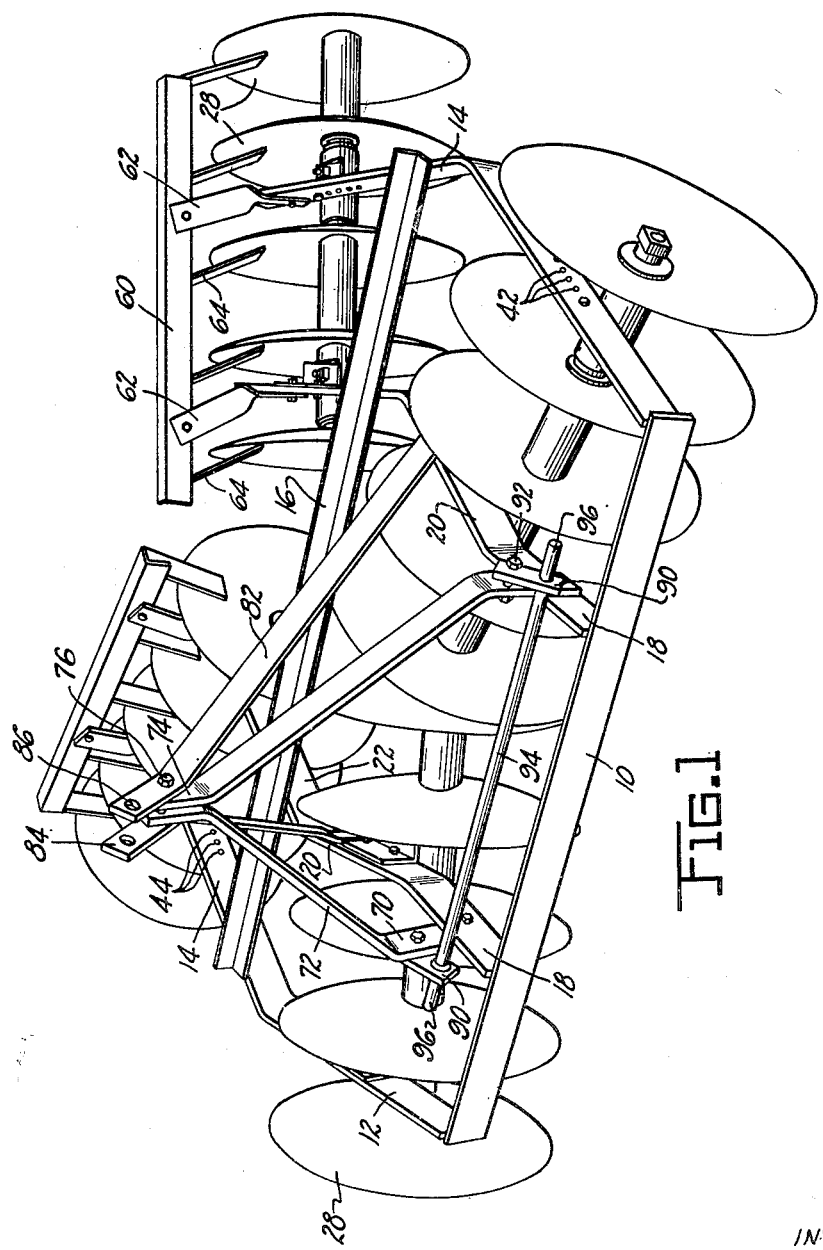
Fig. 1 is a perspective view of the harrow.
Figure 2:
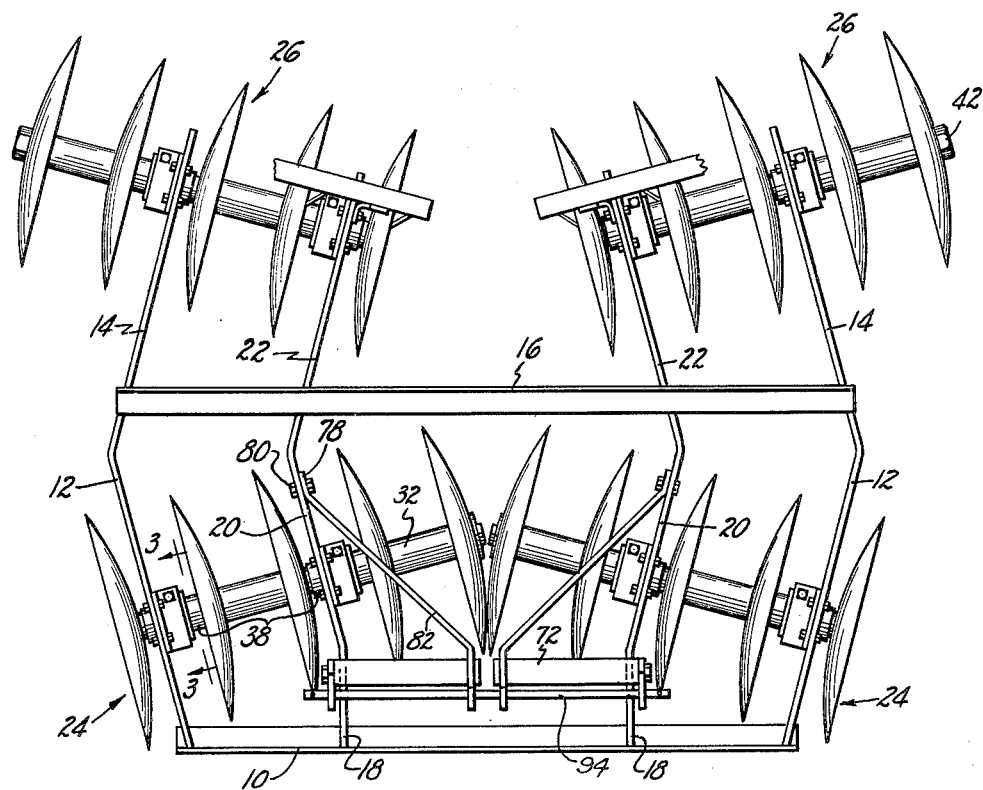
Fig. 2 is a top plan view of the harrow.

Referring to the drawing which illustrates the preferred embodiment of the invention, the numeral 10 designates a front transverse frame member preferably formed of angle iron although a member of any other cross-sectional shape found suitable may be employed. To the opposite and outer ends of the member 10 are fixedly secured a pair of metal bars. These bars are preferably welded to the member 10 and each constitutes a front portion 12 and a rear portion 14. The bars extend rearwardly and horizontally from the member 10 with the portions 12 thereof preferably diverging rearwardly and the portions 14 thereof converging rearwardly. A rear rigid crossbar 16, which may constitute angle iron or a rigid member of any other desired cross-sectional configuration, is fixedly secured at its opposite ends to the rearwardly projecting frame bars as by welding thereof to said bars. As here illustrated, the rear cross-member is secured to the rear portions 14 spaced forwardly from their rear ends and adjacent to the bend at which the bar portions 12 and 14 merge. The bars 12 and 14 preferably are formed of substantially rigid stock of flat elongated cross-sectional shape with the major cross-sectional axis thereof positioned substantially vertically. A second inner pair of generally longitudinal bars, preferably of bar stock of substantially the same type and cross-sectional shape as the outer longitudinal bars, are secured to the transverse frame members 10 and 16. These inner bars, which preferably comprise a front end portion 18, extend substantially perpendicularly rearwardly to the front transverse frame member 10 so that said front portions 18 are substantially parallel to each other. In rearwardly spaced relation to the front ends thereof, the inner bars are bent outwardly to form rearwardly diverging portions 20 which preferably terminate in forwardly spaced relation to the cross-member 16 and which preferably extend substantially parallel to the front portions 12 of the outer frame members. The inner frame members terminate in inwardly converging rear portions 22 which preferably extend substantially parallel to the rear portions 14 of the outer frame members. The inner frame members are suitably secured to the rear cross-member 16 of the frame as by welding.

Figures 3, 4:
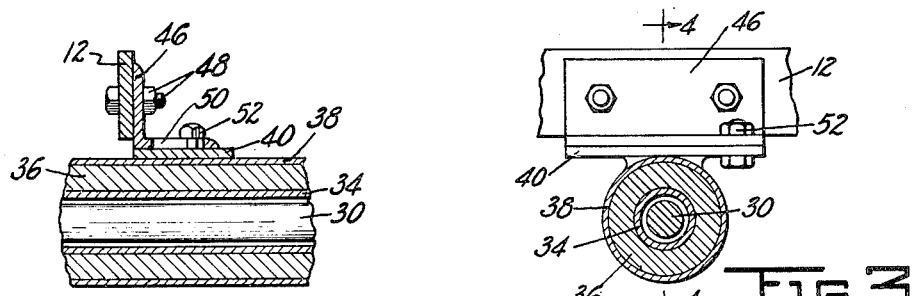
Fig. 3 is an enlarged transverse detail sectional view taken on line 3—3 of Fig. 2.
Fig. 4 is a sectional view taken on line 4—4 of Fig. 3.

The disk harrow mounts a plurality of disk gangs preferably a pair of front disk gangs 24 and a pair of disk gangs 26, said gangs being arranged in tandem in a manner well understood in the art. Each of the gangs may be of any suitable construction. I prefer to use a disk gang of the character and construction illustrated in my co-pending U. S. patent application, Ser. No. 768,168, filed August 12, 1947. Each of these disk gangs comprises a plurality of disk blades 28 having a central opening therein through which extends a shaft 30. The disk blades are spaced apart by rigid tubular members 32 concentric with the disk blades. Each of the gangs mounts bearings at a pair of longitudinally spaced points thereof, said bearings being of the construction best illustrated in Figs. 3 and 4 and constituting the metal tube or sleeve 34 preferably of smaller diameter than the tubes 32. The sleeve or bushing 36 encircles the major portion of each of the tubes 34, said sleeve preferably being formed of oil impregnated wood, although any other material found suitable may be used in the construction of said bushings 36.

A metal sleeve 38 encircles each bushing 36. A rigid flat plate 40 is welded or otherwise secured fixedly to each sleeve 38. One end of the shaft 30 may have an enlarged head, and the opposite end thereof has a nut 42 threaded thereon and adapted to draw the parts of the disk gang into rigid fixed relation. Suitable washers may be employed in the construction to cooperate with the shaft and the various sleeves and bearings constituting parts of the gang to hold the parts of the gang in operative relation to each other.

Each of the outer bearings of each of the two front disk gang members 24 is located adjacent to and below the parts 12 of the outer frame members, and each of the inner bearing members of the front disk gangs 24 is located adjacent and below the frame parts 20 of the inner frame. Similarly, the rear disk gangs 26 have their bearings located adjacent and below the rear ends of the parts 14 of the outer frame members and parts 22 of the inner frame members. Each of the outer frame members has a plurality of openings 42 formed in the portion 12 thereof in longitudinally spaced relation and openings 44 in the rear portions 14 thereof. An angle iron has one flange or leg 46 thereof positioned vertically and is provided with openings adapted to register with selected ones of the sets of openings 42, 44 of the outer frame members to receive detachable securing means such as nuts and bolts 48. The horizontal flange 50 of each of said angle irons is provided at one end thereof with an opening registering with an opening in the bearing plate 40 carried by the sleeve 38 of each bearing of each disk gang at a point opposite from the vertical plane of the axis of said disk gang. Suitable securing means, such as a bolt and nut 52, secure the angle iron plate 50 to the bearing plate 40 and provide for pivotal connection between the parts. Similar angle irons are secured to the portions 20 and 22 of the inner frame members, preferably in a fixed position, and the plates 50 of said angle irons are connected by bolts 52 with the adjacent bearing plate 40 to provide a second pivotal point. It will be apparent, therefore, that by releasing the bolts 48 on the outer frame members 12, it is possible to adjust the position of the outer ends of the disk gangs longitudinally of said members 12 by re-locating the same at proper or desired ones of the openings of the sets 22 and 24 of the outer frame members. This provides for adjustment of the setting of the gangs in any selected position. Another advantage of the construction is that the location of the plane of the rigid frame member is spaced only slightly above the axle or shaft of the disk gangs, and the twisting movement of the disk gangs as applied to the connection of the gangs with the frame is reduced to a minimum because of a reduction in this spacing. The opening in the horizontal flange 50 of each bracket may be elongated transversely thereof to accommodate changes in the angular setting of the disk gangs relative to the longitudinal members of the frame.

If desired, each of the rear disk gangs may have a superimposed frame comprising the cross-frame members 60, such as an angle iron, mounted by means of rigid brackets 62 projecting therebelow and secured to the rear ends of the parts 14 and 22 of the longitudinal members of the frame. The brackets 62 will hold the cross-members 60 in desired position above the disk blades and in a position such that scraper blades 64 fixedly carried by said bar 60 may engage the inner or dished surfaces of the disk blades 28.

A superstructure or A-frame is carried by the rigid frame in this device and comprises front members whose lower end portions 70 are fixedly secured to and extend substantially vertically above the front end portions 18 of the inner longitudinal frame members. These front frame members converge inwardly and upwardly at 72 and terminate in upper substantially parallel end portions 74 which are interconnected by a suitable bolt 76. The vertical position of the members 70, 72, 74 is controlled by inclined braces whose lower end portions 78 are secured by bolts or other securing means 80 to the inner frame members, preferably adjacent the rear ends of the portions 20 thereof. The lower frame members converge upwardly and forwardly at 82 and terminate in substantially parallel upper end portions 84 which are connected together by means of the bolt 76 to form a rigid nontilting unit. The free ends of the portions 84 of the A-frame may be provided with openings 86 adapted to receive a connector pin for connection of one of the arms of a hitch mechanism.

To each of the portions 70 of the front members of the A-frame is bolted or otherwise pivotally connected at a point above the level of the front ends of the inner frame members 18 a lever 90. These levers 90 are pivotally connected to the A-frame members 70 as by means of bolts or other pivot pins 92. The ends of the short rigid links or levers 90 are rigidly interconnected by a cross-bar 94 welded or otherwise suitably secured thereto. The length of the links 90 is limited so that the spacing between the crossbar 94 and the pivot pins 92 is limited. The ends of the crossbar 94 project outwardly beyond the links 90 at 96 and provide connectors for connection with the lower lift hitch arms of a conventional three-arm lift hitch.

This harrow possesses all of the features required for an effective and operative lift type disk harrow. While the construction of the harrow itself is rigid and all parts are anchored firmly against flexibility, one with respect to the other, the connection between the two lower arms or tension links of a three-point lift hitch at the end portions 96 of the crossbar 94 permits relative movement between said hitch tension arms and the rigid harrow. Consequently, as the contour of the ground being worked may change to require the harrow to assume a different working attitude or position than the tractor, the harrow is free to follow the contour of the ground which it engages because of the free swinging connection of the crossbar 94 to the rigid harrow by means of the pivoted links 90. This freedom of movement does not interfere with the bodily lifting or elevation of the harrow above the ground upon the operation of the lift hitch in an elevating direction, however, because of the limits placed upon the range of pivotal movement of the links 90. The lower range of this pivotal movement is determined by the point of engagement of the crossbar 94 either with the inner frame parts 18 or the front edges of the A-frame member 70. The upper range of pivotal movement of the links 90 is determined by the point at which the crossbar 94 will engage the front edges of the A-frame members 70, 72 to which the links 90 are pivoted. Consequently, as the hitch arms are shifted in harrow raising position, the pivotal connection unit comprising the links 90 and the crossbar 94 will be moved to the upper limit above mentioned and thereafter further elevating movement of the hitch arms will be effective to raise the harrow as a unit to the desired elevation. In other words, the links 90 and crossbar 94 provide a lost motion connection between the hitch arms and the harrow, both during the working operation of the harrow and during the start of the lifting operation.

The frame unit, while substantially rigid in a vertical direction, is adapted in the form illustrated to accommodate a limited lateral displacement of the longitudinal frame members relative to each other. This limited lateral displaceability, for example, permits the frame portions 12 to be drawn inwardly or urged outwardly relative to the inner longitudinal frame members to accommodate any change in the angular setting of the disk gangs to a position beyond that accommodated by the elongated slots in the bracket flanges 50. In the event this lateral deflection is not desired, it can be eliminated by making the portions of the longitudinal members 12 in which the set of adjustment apertures 42 is formed substantially concentric with the pivot axes of the inner bearings of the front disk gang. The portions of the longitudinal frame members which extend or project rearwardly from the cross-member 16 have further inherent flexibility by virtue of the fact that they are connected together only by said frame member and by the rear disk gangs 26 and thus accommodate any lateral deflection necessary to accommodate a change in the angle of the gang setting. This lateral deflection is limited, however, by the cross-member 16 and by the general rigidity and strength of the parts.

It will be apparent that the device is formed of a minimum number of parts so that the construction is of light weight. This light weight is achieved without sacrifice of the strength of the construction. Inasmuch as the disk blades have an inherent tendency to dig into the ground there is no need for the harrow to be of any greater weight than is essential for the required rigidity and strength of the various parts. The reduction to a minimum of the weight of the implement, together with the close longitudinal coupling of the tandem disk gangs, is important to reduce any tendency of the harrow to be displaced laterally with respect to true or desired tracking or following relation to the tractor and also to hold to a minimum the leverage exerted by the implement when elevated in a manner which would tend to overbalance the front end of the tractor and cause the tractor to tilt about its rear wheels. The instant construction effectively prevents both any tendency of the harrow to be displaced laterally from the tractor and any possibility that the front end of the tractor will be overbalanced by the harrow. Other advantages of the harrow will be apparent, such as the low cost thereof incident to its light weight, simplicity of construction and reduction in the number of working parts.

While the preferred embodiment of the invention has been illustrated and described herein, it will be understood that changes may be made in the construction within the scope of the appended claims without departing from the spirit of the invention.

I claim:

1. A lift type disk harrow of the tandem type comprising a plurality of fixedly interconnected longitudinal and transverse rigid members, a plurality of upwardly converging and interconnected rigid members carried by said first members, said members defining a rigid frame having a rigid superstructure at its front central portion, a plurality of fore and aft disk gangs each including a shaft, a pair of spaced bearings and a plurality of disk blades, said bearings having small vertical clearance with said longitudinal frame members, a plurality of spaced rigid brackets fixedly interconnecting said bearings and said longitudinal members, and a plurality of connectors carried by the front of said frame in spaced relation and adapted for attachment of a power-actuated lift hitch therewith, at least one of said connectors being carried by said superstructure at a level above the other connectors, each of said bearings fixedly mounting a flat bearing plate, each bracket including a horizontal bottom surface in face engagement with one of said bearing plates.

2. A lift type disk harrow of the tandem type comprising a plurality of fixedly interconnected longitudinal and transverse rigid members, a plurality of upwardly converging and interconnected rigid members carried by said first members, said members defining a rigid frame having a rigid superstructure at its front central portion, a plurality of fore and aft disk gangs each including a shaft, a pair of spaced bearings each having a flat portion and a plurality of disk blades, said longitudinal frame members having slight clearance above said bearings, a plurality of spaced rigid brackets fixedly interconnecting said bearings and said longitudinal members, and a plurality of connectors carried by said frame in spaced relation at the front thereof and adapted for attachment of a power-actuated lift hitch therewith, at least one of said connectors being carried by said superstructure above the level of the others, said brackets constituting angle irons each having a vertical web secured to said frame and a horizontal web positioned below the bottom edges of said frame members to define said clearance and secured to a bearing in engagement with said flat portion.

3. A tandem lift type disk harrow comprising a plurality of fixedly interconnected longitudinal and transverse rigid members, a plurality of upwardly converging and interconnected rigid members carried by said first members, said members defining a rigid frame having a rigid superstructure at its front central portion, front and rear disk gangs each including a shaft, a pair of spaced bearings and a plurality of disk blades, a plurality of spaced rigid brackets fixedly interconnecting said bearings and said longitudinal members with slight vertical clearance, and a plurality of connectors carried by said frame in spaced relation at the front thereof and adapted for attachment of a power-actuated lift hitch therewith, at least one of said connectors being carried by said superstructure, said longitudinal frame members constituting bars of elongated cross-sectional shape having their major axis positioned vertically, said bearings each having a flat outer surface, said brackets each having a pair of perpendicularly disposed flat surfaces respectively abutting a side of a frame member and the flat surface of a bearing, said longitudinal frame members projecting rearwardly from the rearmost transverse member and mounting the brackets connected to the bearings of said rear gang.

4. A lift type disk harrow comprising a plurality of fixedly interconnected longitudinal and transverse rigid members, a plurality of upwardly converging and interconnected rigid members carried by said first members, said members defining a rigid frame having a rigid superstructure at its front central portion, a plurality of disk gangs each including a shaft, a pair of spaced bearings and a plurality of disk blades, a plurality of spaced rigid brackets fixedly interconnecting said bearings and said longitudinal members with small vertical clearance, and a plurality of connectors carried by said frame in spaced relation at the front thereof and adapted for attachment of a power-actuated lift hitch therewith, at least one of said connectors being carried by said superstructure, said longitudinal frame members constituting bars of elongated cross-sectional shape having their major axis positioned vertically, at least one longitudinal frame member adjacent to each disk gang having a longitudinal set of spaced openings, detachable securing means extending through selected openings of said sets to secure said brackets in selected position, each bracket being pivotally connected to a bearing about a vertical axis.

5. A lift type disk harrow comprising a plurality of fixedly interconnected longitudinal and transverse rigid members, a plurality of converging and interconnected rigid members carried by said first members, said members defining a rigid frame having a rigid superstructure at its front central portion, a plurality of disk gangs each including a shaft, a pair of spaced bearings and a plurality of disk blades, a plurality of spaced rigid brackets fixedly interconnecting said bearings and said longitudinal members in intersecting relation with slight vertical clearance, and a plurality of connectors carried by said frame in spaced relation at the front thereof and adapted for attachment of a power-actuated lift hitch therewith, at least one of said connectors being carried by said superstructure, and a member carried by the front of said frame for pivotal movement on a transverse axis between predetermined limits, said pivoted member mounting at least one of said connectors.

6. A lift type disk harrow comprising a plurality of fixedly interconnected longitudinal and transverse rigid members, a plurality of upwardly converging and interconnected rigid members carried by said first members, said members defining a rigid frame having a rigid superstructure at its front central portion, a plurality of disk gangs each including a shaft, a pair of spaced bearings and a plurality of disk blades, a plurality of spaced rigid brackets fixedly interconnecting said bearings and said longitudinal members, and a plurality of connectors carried by said frame in spaced relation at the front thereof and adapted for attachment of a power-actuated lift hitch therewith, at least one of said connectors being carried by said superstructure, said longitudinal frame members having openings adjacent to said disk gangs, detachable securing means extending through said openings to secure said brackets to said frame, the openings adjacent to selected ends of said gangs accommodating location of said securing means in selected position in a predetermined range of adjustment longitudinally of said frame members, each bracket being pivotally connected to a bearing about a vertical axis.

7. A lift type disk harrow comprising a plurality of fixedly interconnected longitudinal and transverse rigid members, a plurality of converging and interconnected rigid members carried by said first members, said members defining a rigid frame having a rigid superstructure at its front central portion, a plurality of disk gangs each including a shaft, a pair of spaced bearings and a plurality of disk blades, a plurality of spaced rigid brackets fixedly interconnecting said bearings and said longitudinal members in intersecting relation, and a plurality of connectors carried by said frame in spaced relation at the front thereof and adapted for attachment of a power-actuated lift hitch therewith, at least one of said connectors being carried by said superstructure, and a member extending transversely at the front of the frame and pivoted thereto between predetermined limits, said pivoted member mounting at least one of said connectors.

References Cited in the file of this patent

UNITED STATES PATENTS

| Number | Name | Date |
|---|---|---|
| 488,779 | Spaulding et al. | Dec. 27, 1892 |
| 834,650 | Wolf | Oct. 30, 1906 |
| 1,254,843 | Palser | Jan. 29, 1918 |
| 1,531,278 | Flatley | Mar. 31, 1925 |
| 1,916,945 | Ferguson | July 4, 1933 |
| 2,152,347 | Ferraro | Mar. 28, 1939 |
| 2,394,210 | Sherman | Feb. 5, 1946 |
| 2,414,114 | Martin | Jan. 14, 1947 |
| 2,420,437 | McMahon | May 13, 1947 |
| 2,430,732 | Orelind et al. | Nov. 11, 1947 |
| 2,456,693 | Fraga | Dec. 21, 1948 |

FOREIGN PATENTS

| Number | Country | Date |
|---|---|---|
| 556,859 | Great Britain | Oct. 26, 1943 |